United States Patent
Sekiguchi et al.

(10) Patent No.: US 10,447,349 B2
(45) Date of Patent: Oct. 15, 2019

(54) WIRELESS COMMUNICATION SYSTEM AND WIRELESS COMMUNICATION APPARATUS

(71) Applicant: KABUSHIKI KAISHA TOSHIBA, Minato-ku (JP)

(72) Inventors: Takahiro Sekiguchi, Yokohama (JP); Noritaka Deguchi, Yokohama (JP); Tatsuma Hirano, Chiyoda (JP); Makoto Higaki, Setagaya (JP); Kazuhiro Inoue, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 65 days.

(21) Appl. No.: 15/642,514

(22) Filed: Jul. 6, 2017

(65) Prior Publication Data
US 2017/0310368 A1 Oct. 26, 2017

Related U.S. Application Data (63) Continuation of application No. PCT/JP2015/085807, filed on Dec. 22, 2015.

(30) Foreign Application Priority Data

Jan. 9, 2015 (JP) .................. 2015-003582

(51) Int. Cl.
*H04B 5/00* (2006.01)
*G06K 7/10* (2006.01)
*H04L 29/08* (2006.01)

(52) U.S. Cl.
CPC .............. *H04B 5/0062* (2013.01); *G06K 7/10* (2013.01); *H04L 67/12* (2013.01); *H04L 67/18* (2013.01)

(58) Field of Classification Search
CPC ....... H04B 5/0062; H04L 67/12; B61L 3/125; B61L 23/34; B61L 25/021;
(Continued)

(56) References Cited

U.S. PATENT DOCUMENTS

2007/0141997 A1* 6/2007 Wulff ................. G06K 19/0723
455/78
2009/0184827 A1* 7/2009 Petropoulos ....... G06K 7/10336
340/572.7

FOREIGN PATENT DOCUMENTS

| CN | 102680730 A | 9/2012 |
|----|-------------|--------|
| CN | 202481095 U | 10/2012 |

(Continued)

OTHER PUBLICATIONS

JP2007015574A Oji et al, machine translated.*

(Continued)

*Primary Examiner* — Jianxun Yang
(74) *Attorney, Agent, or Firm* — Oblon, McClelland, Maier & Neustadt, L.L.P.

(57) ABSTRACT

A wireless communication system includes a first tag installed on a ground outside a track for a running train, the first tag being driven by wirelessly received power, a second tag installed outside a side face of the train and above the first tag, the side face extending in a running direction, the second tag being driven by wirelessly received power, a wireless communicator which is installed in the train and performs wireless communication with the first tag and the second tag, and an antenna which is installed in the train and has a gain in directions of the first tag and the second tag.

12 Claims, 5 Drawing Sheets

(58) Field of Classification Search
CPC ............. B61L 27/0038; B61L 27/0077; B61L 25/025; B60T 8/1705; G06K 19/0723; G06K 7/10336; G06K 7/10079; H01Q 1/2216

See application file for complete search history.

(56) References Cited

FOREIGN PATENT DOCUMENTS

| | | |
|---|---|---|
| JP | 4-86573 U | 7/1992 |
| JP | 10-315972 | 12/1998 |
| JP | 2007-15574 | 1/2007 |
| JP | 2007-132089 A | 5/2007 |
| JP | 2007-329621 | 12/2007 |
| JP | 2012-174176 | 9/2012 |
| JP | 2013-136261 | 7/2013 |

OTHER PUBLICATIONS

JP10-315972, Yasuhiko et al, machine translated.*
International Search Report dated Feb. 2, 2016 in PCT/JP2015/085807 filed Dec. 22, 2015.

* cited by examiner

WIRELESS COMMUNICATION SYSTEM AND WIRELESS COMMUNICATION APPARATUS

TECHNICAL FIELD

Embodiments relate to a wireless communication system and a wireless communication apparatus, performing wireless communication using tags.

BACKGROUND ART

As representative safety equipment for trains to safely run and stop, automatic train stop (ATS) and automatic train control (ATC) are known. Moreover, as representative operation support equipment, automatic train operation (ATO) and train automatic stop-position controller (TASC) are known.

The conventional safety equipment and operation support equipment perform train-body position detection using a transponder, track circuitry, etc., and have a problem that it takes much cost to install the transponder, track circuitry, etc.

In view of the above circumstances, it is considered to use RFID (Radio Frequency Identification) for position detection. The RFID is a mechanism in which a reader wirelessly reads individual identification information stored in a tag. The RFID can be implemented with a much lower cost than position detection using the transponder, track circuitry, etc., and with a relatively low maintenance cost.

In the case of train-body position detection using the RFID, it is desirable to install a reader at a body side and a tag at a ground side. Because, if the tag at the ground side is a passive type with no power needed, auxiliary facilities to be installed along with tag installation are not needed and hence a facility cost at the ground side can be restricted.

Wireless communication with the tag and the reader becomes more stable as the distance between the tag and the reader is shorter. However, as the distance between the tag and the reader is shorter, the wireless communication range becomes smaller, so that skip reading may occur while a train is running at high speeds. Conversely, as the distance between the tag and the reader is longer, since the wireless communication range becomes larger, the frequency of skip reading is reduced while the train is running at high speeds, however, position accuracy is lowered while the train is running at low speeds.

As described above, there are an advantage and a disadvantage for both cases of a long distance and a short distance between the tag and the reader. It is therefore desirable, if possible, to install tags in a plurality of locations with different distances from the reader.

Since a train on-board system demands high reliability, it is required to be a duplex system under consideration of occurrence of failure in wireless communication for some reasons. As described above, in the case of installing tags on a track and along the track, and if the duplex system is implemented in each of the tags on the track and along the track, the number of antennas is increased, resulting in a complicated reader configuration.

In the case of a single antenna having directivity in different directions, by making larger the size of the antenna element than the wavelength of a used frequency, the antenna can have bidirectional directivity. However, in the case of RFID in a 920-MHz band, the wavelength is about 33 cm, it is highly likely that the size of an antenna including the outer frame is larger than the size of the conventional transponder on-board equipment. The duplex system requires two antenna elements of this size and hence there is a difficulty in securing an installation space in the train body.

In the case where a tag is installed in the center area of a track, if a reader antenna is installed on the bottom of a train body just above the tag, since there are several kinds of under-floor equipment, such as a motor, under the bottom of the train body, electromagnetic waves from the antenna are reflected by the under-floor equipment, causing unstable wireless communication with the tag.

DISCLOSURE OF INVENTION

A problem to be solved by the embodiments is to provide a wireless communication system and a wireless communication apparatus, capable of stable wireless communication between a train and the ground, with a low facility cost.

In the present embodiment, there is provided a wireless communication system including a first tag installed on a ground outside a track for a running train, the first tag being driven by wirelessly received power, a second tag installed outside a side face of the train and above the first tag, the side face extending in a running direction, the second tag being driven by wirelessly received power, a wireless communicator which is installed in the train and performs wireless communication with the first tag and the second tag, and an antenna which is installed in the train and has a gain in directions of the first tag and the second tag.

BEST MODE FOR CARRYING OUT THE INVENTION

Embodiments will be explained with reference to the drawings. The following embodiments will be explained mainly with unique configurations and operations in a wireless communication system and a wireless communication apparatus. However, the wireless communication system and the wireless communication apparatus may have configurations and operations, the explanations of which are omitted in the following explanation. These omitted configurations and operations fall within the scope of the present embodiment.

(First Embodiment)

Figure 1:
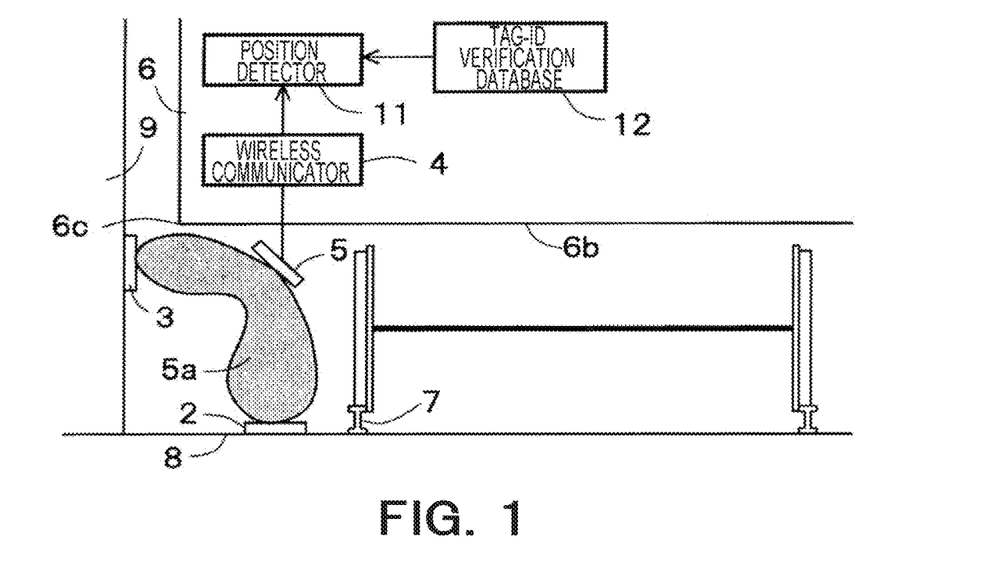
FIG. 1 is a block diagram schematically showing the configuration of a wireless communication system 1 according to a first embodiment.

FIG. 1 is a block diagram schematically showing the configuration of a wireless communication system 1 according to a first embodiment. The wireless communication system 1 of FIG. 1 is provided with a first tag 2, a second tag 3, a wireless communicator 4, and an antenna 5.

The first tag 2 is installed on a ground 8 outside a track (railway) 7 on which a train 6 runs. There are a plurality of first tags 2 installed on the ground 8 at regular or irregular intervals. The first tag 2 may be installed in contact with the ground 8 or attached to a stay or the like extending upward from the ground 8.

Figure 2:
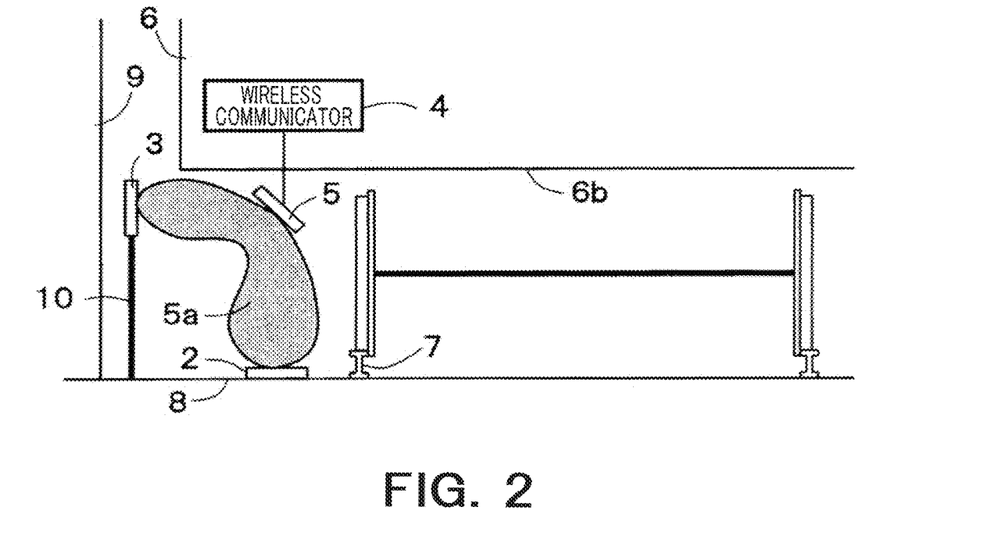
FIG. 2 is a block diagram showing an example in which a second tag is installed on a stay.
Figure 3:
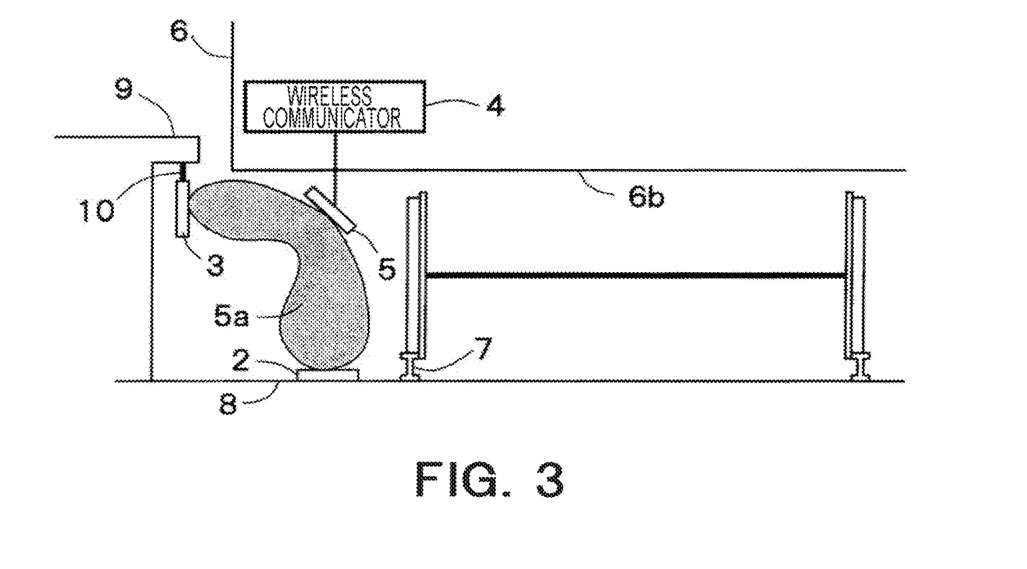
FIG. 3 is a block diagram showing an example in which the second tag is installed under a platform.

The second tag 3 is installed outside a side face 6a of the train 6, the side face 6a extending in a running direction, and installed above the first tag 2. The second tag 3 may, for example, be attached to a side wall or the like of a platform 9 or attached to a stay 10 or the like extending upward from the ground 8, as shown in FIG. 2. Moreover, as shown in FIG. 3, the second tag 3 may be suspended from a stay 10 or the like extending downward from the platform 9. There is also a plurality of second tags 3 installed at regular or irregular intervals.

The first tag 2 and the second tag 3 are passive tags driven by power wirelessly received from the wireless communicator 4. A memory (not shown) for storing individual identification information is built in each of the first tag 2 and the second tag 3. The individual identification information is information for identifying each tag, with no particular limitation on its data format. Information other than the individual identification information may be stored in the memory.

The antenna 5 is attached to a bottom 6b of a body of the train 6. The wireless communicator 4 is electronically connected with the antenna 5. The wireless communicator 4 performs wireless communication with the first tag 2 and the second tag 3. The wireless communicator 4 may only have a function as a reader for receiving the individual identification information stored in the first tag 2 and the second tag 3 or may have, in addition, a function as a writer to write some information in these tags.

A wireless signal received by the antenna 5 is input to the wireless communicator 4 and subjected to a demodulation process. Since the first tag 2 and the second tag 3 are each a passive type, first of all, electromagnetic waves are radiated from the antenna 5 toward the first tag 2 and the second tag 3. The first tag 2 and the second tag 3 accumulate power of received electromagnetic waves and then, using the accumulated power, radiate electromagnetic waves including the individual identification information from an antenna 5 of each tag. The antenna 5 of the wireless communicator 4 receives electromagnetic waves transmitted from the first tag 2 and the second tag 3. A high-frequency signal carried by the received electromagnetic waves is supplied from the antenna 5 to the wireless communicator 4. The wireless communicator 4 demodulates the high-frequency signal to acquire the individual identification information.

The antenna 5 is installed, for example, above the first tag 2. In more specifically, it is preferable that the antenna 5 is installed on the bottom 6b of the train 6 in a zone from a location at the first tag-2 side to an end 6c of the side face 6a of the train 6 at the second tag-3 side, rather than the center in a transverse direction of the bottom 6b. Since the first tag 2 is installed on the ground 8 outside the track 7, the antenna 5 is installed outside the center in the transverse direction of the bottom 6b of the train 6. In the center area of the bottom 6b of the train 6, under-floor equipment, such as, several kinds of electrical equipment, for example, a motor and a bogie that supports the body of the train 6, are installed. Therefore, electromagnetic waves transmitted and received at the antenna 5 are reflected irregularly in the center area of the bottom 6b of the train 6, having not so good electromagnetic wave characteristics. Since the edge side of the bottom 6b of the train 6 has few pieces of under-floor equipment installed. Therefore, by installing the antenna 5 in a location with few pieces of under-floor equipment, electromagnetic waves can be stably transmitted and received.

Moreover, as shown in FIG. 1, when a direct distance between the first tag 2 and the second tag 3 is relatively short, both tags can perform stable wireless communication with the common antenna 5 at the train-6 side. Therefore, there is no need to install a plurality of antenna 5 elements at the train-6 side for each tag, so that an RFID facility cost at the train-6 side can be reduced.

In the example of FIG. 1, a normal direction of the first tag 2 on its installation surface and a normal direction of the second tag 3 on its installation surface intersect with each other. In this case, the antenna 5 is installed, for example, inclined to the normal directions of both tags.

Figure 4:
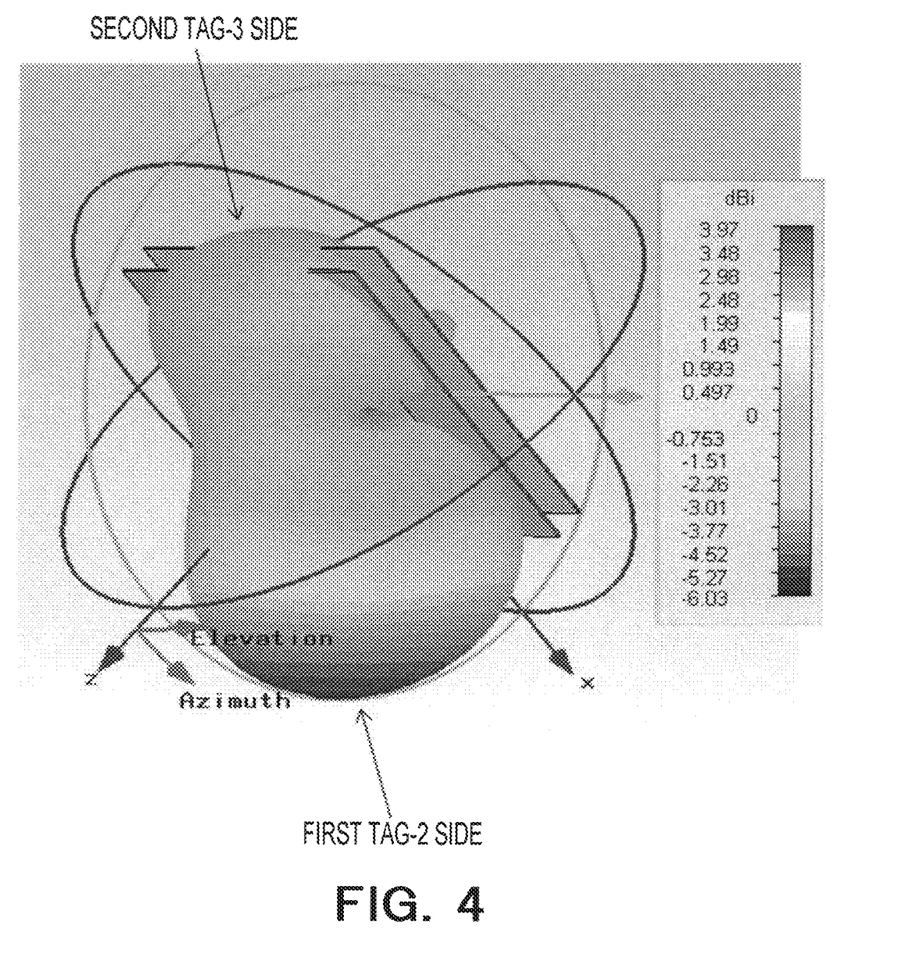
FIG. 4 is an illustration showing an example of a gain pattern of an antenna 5 modelled in three dimensions.

The antenna 5 is, for example, a plane antenna 5 having an asymmetrical structure, formed on a rectangular substrate. FIG. 4 is an illustration showing an example of a gain pattern of the antenna 5 modelled in three dimensions. The antenna 5 of FIG. 4 has a higher gain in the directions of the first tag 2 and the second tag 3. In the example of FIG. 4, the distance from the antenna 5 to the second tag 3 is shorter than the distance from the antenna 5 to the first tag 2. In this case, the gain in the direction from the antenna 5 to the second tag 3 is set to be lower than the gain in the direction from the antenna 5 to the first tag 2. The formation of an antenna 5 having a gain pattern such as shown in FIG. 4 can be realized by adjusting the antenna pattern shape and size, the location of a feeding point, etc. of the plane antenna 5. The plane antenna 5 of FIG. 4 has a laminated structure of a flat board having an antenna pattern formed thereon and another flat board having a ground solid pattern formed thereon.

It is desirable that the length of the antenna 5 in the longitudinal direction of the rectangular substrate is shorter than the wavelength of a used frequency, for compactness. A compact antenna 5 can be realized with an inverted-L or -F shape antenna pattern, and the like.

Figure 5:
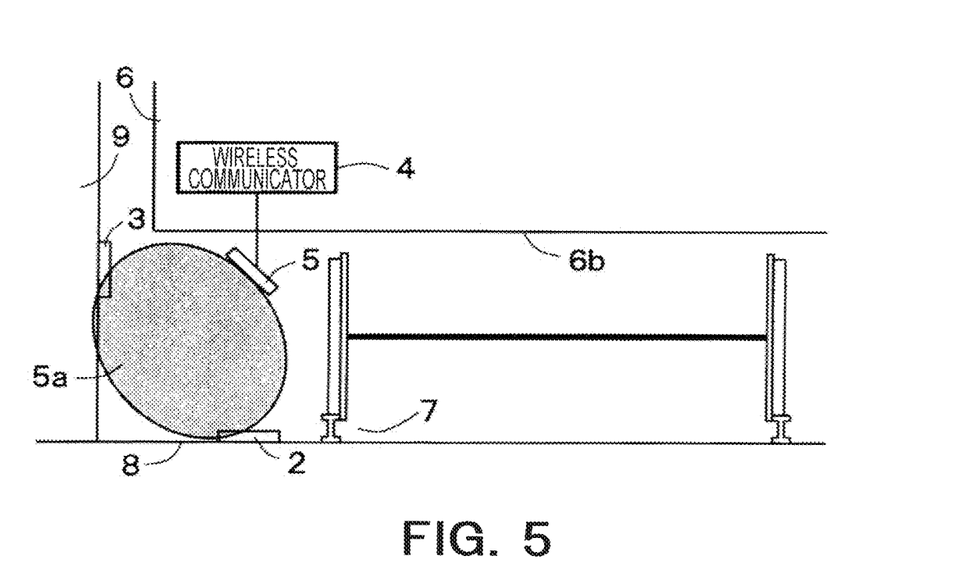
FIG. 5 is an illustration showing an example of the antenna 5 having an omnidirectional gain pattern.

As described above, the antenna 5 in FIGS. 1 and 4 has a gain pattern with a higher gain in the directions of the first and second tags 2 and 3. Not only that, as shown in FIG. 5, an antenna 5 having an almost omnidirectional gain pattern may perform stable wireless communication with the first and second tags 2 and 3.

The individual identification information acquired by the wireless communicator 4 is used in position detection of the train 6, for example. In the case of position detection of the train 6, for example, a position detector 11 and a tag-ID verification database 12 may be installed in the train 6. The tag-ID verification database 12 stores individual identification information and the associated installation location information, for each tag. The position detector 11 refers to the tag-ID verification database 12 using the individual identification information received from the first and second tags 2 and 3 to read the associated installation location information, thereby detecting the current position of the train 6.

The individual identification information stored in the first and second tags 2 and 3 may be used for a purpose other than the position detection of the train 6. For example, speed detection of the train 6 is possible by acquiring information on the individual identification information that has passed within a predetermined period of time. Or the individual identification information stored in the first and second tags 2 and 3 may be transmitted to a train operation managing center (not shown) by wired or wireless transmission from the train 6, for operation management on each train 6.

It is desirable that position detection using the first and second tags 2 and 3 is possible even while the train 6 is running at high or lower speeds. It has been said that, in a conventional transponder, the gap between on-board equipment and ground equipment is about 25 cm, capable of receiving eight telegram massages in succession at a speed of 160 km/h.

Figure 6:
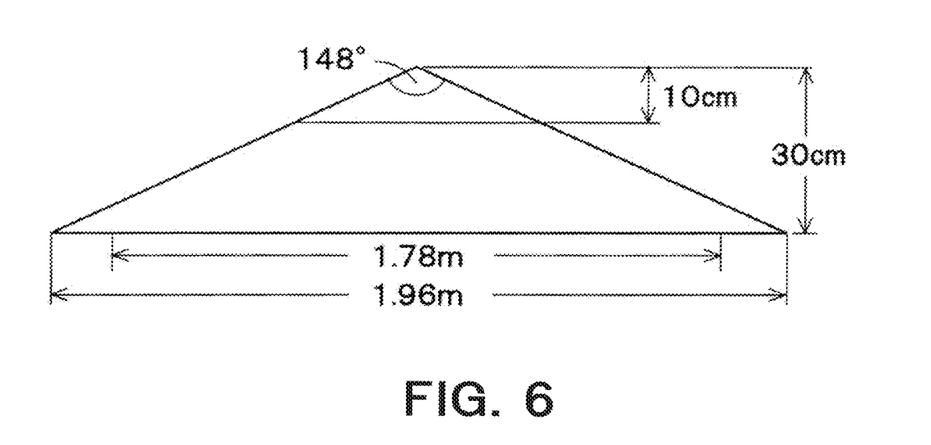
FIG. 6 is an illustration showing beam divergence of an antenna.

If the time required for receiving one frame with the RFID is 5 ms, the travel distance for eight frames at the speed of 160 km/h is 1.78 m. Therefore, a tag readable range is 1.96 m with a 10% margin. If it is supposed that the distance between the antenna 5 at the train-6 side and the tag is 30 cm, and if the sizes of the antenna 5 and the tag are neglected, beam divergence of the antenna 5 requires at least 148° as shown in FIG. 6. In this case, a position detection error in the running direction of the train 6 is ±98 cm.

If the distance between the antenna 5 at the train-6 side and the tag is 10 cm, and if the beam divergence of the antenna 5 is 148° the same as above, a tag readable range is 65 cm, with ±32.5 cm in position detection error. The maximum speed at which eight frames are successively readable in a readable range of 65 cm is 58.5 km/h. It is therefore possible to improve position detection accuracy at the speed of 58.5 km/h or lower.

As described above, the best distance between the antenna 5 (for example, a reader antenna 5) at the train-6 side and the tag depends on the maximum speed of the train 6 and the position detection accuracy. In general, the train 6 runs close to the platform 9, so that it is possible to make the distance between the side face 6a of the train 6 and the platform 9 shorter than the distance between the body bottom 6b of the train 6 and the ground 8 under the bottom 6b. Accordingly, in the present embodiment, the first tag 2 is installed on the ground 8 outside the track 7 and the second tag 3 is installed on the side face 6a or the like of the platform 9. Therefore, the distance between the first tag 2 and the antenna 5 becomes longer than the distance between the second tag 3 and the antenna 5. At high speed running, the individual identification information of the first tag 2 is received by the antenna 5 to improve reading characteristics at high speeds. At low speed running, the individual identification information of the second tag 3 is received by the antenna 5 to improve position detection accuracy at low speeds.

As described above, in the first embodiment, the first tag 2 is installed on the ground 8 outside the track 7 of the train 6 and the second tag 3 is installed at the side face-6a side of the train 6. Stable wireless communication is achieved by the antenna 5 installed at the bottom-6b side of the train 6, with the first and second tags 2 and 3. Accordingly, with a low facility cost, the individual identification information stored in the first and second tags 2 and 3 can be received by the antenna 5 at the train-6 side to make possible the position detection of the train 6 using the RFID. The facility cost is much lower than using the conventional transponder, track circuitry, etc.

Moreover, for example, by setting the distance from the first tag 2 to the antenna 5 longer than the distance from the second tag 3 to the antenna 5, position detection of the train 6 running at high speeds can be surely performed using the first tag 2 while position detection of the train 6 running at low speeds can be accurately performed using the second tag 3.

Furthermore, by adjusting a gain pattern of the antenna 5 so as to have a higher gain in the direction of the first tag 2 and in the direction of the second tag 3, it is possible, with only one antenna 5, to perform wireless communication with the first and second tags 2 and 3, achieving reduction of an RFID facility cost at the train-6 side.

Still furthermore, in the present embodiment, since the first tag 2 is installed on the ground 8 outside the track 7, the first tag 2 and the second tag 3 can be closely arranged, and the antenna 5 can be installed at the edge side of the bottom 6b of the train 6. Accordingly, the antenna 5 can be installed at a location with less electromagnetic wave interferences from a several kinds of under-floor equipment installed in the bottom 6b of the train 6. Therefore, the antenna 5 can perform wireless communication with the first and second tags 2 and 3 in a state of less electromagnetic wave interferences.

(Second Embodiment)

In a second embodiment, separate antenna elements are installed at the trains-6 side in association with respective tags, with one wireless communicator 4 connected to two antenna elements functioning as one antenna.

Figure 7:
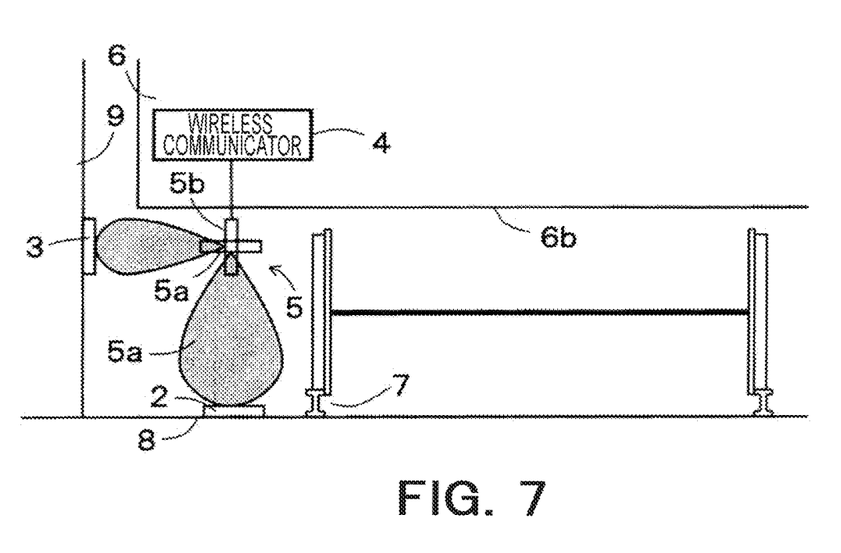
FIG. 7 is a block diagram schematically showing the configuration of a wireless communication system 1 according to a second embodiment.

FIG. 7 is a block diagram schematically showing the configuration of a wireless communication system 1 according to the second embodiment. The wireless communication system 1 of FIG. 7 is the same as that of the first embodiment, except for the configuration of an antenna 5 installed at the edge side of the bottom 6b of the train 6.

The antenna 5 of FIG. 7 has a first antenna unit 5a and a second antenna unit 5b. The first antenna unit 5a has directivity in the direction of the first tag 2, with no directivity in the direction of the second tag 3. The first antenna unit 5a is used for wireless communication only with the first tag 2. The second antenna unit 5b has directivity in the direction of the second tag 3, with no directivity in the direction of the first tag 2. The second antenna unit 5b is used for wireless communication only with the second tag 3.

The first antenna unit 5a and the second antenna unit 5b are arranged apart from each other. In other words, the first antenna unit 5a and the second antenna unit 5b can transmit and receive electromagnetic wave irrespective of each other. The first antenna unit 5a and the second antenna unit 5b may be formed on the same substrate with different antenna patterns or on separate substrates. FIG. 7 shows a schematic example of the first antenna unit 5a and the second antenna unit 5b formed on separate substrates, which is merely one example.

Since it is enough for the first antenna unit 5a and the second antenna unit 5b each to have directivity in one direction only, the antenna 5 can be designed easier than the antenna 5 having directivity in two directions in the first embodiment.

Nevertheless, in the case where the distance between the first tag 2 and the first antenna unit 5a is longer than the distance between the second tag 3 and the second antenna unit 5b, the first antenna unit 5a is required to have a higher antenna gain than the second antenna unit 5b.

As described above, in the second embodiment, since the first antenna unit 5a is associated with the first tag 2 while the second antenna unit 5b is associated with the second tag 3, even if the first tag 2 and the second tag 3 are installed in different directions, the antenna units can perform wireless communication with the respective tags with an appropriate gain, improving position detection accuracy, for example.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE NUMERALS

1 wireless communication system, 2 first tag, 3 second tag, 4 wireless communicator, 5 antenna, 5a first antenna unit, 5b second antenna unit, 6 train, 7 track, 8 ground, 9 platform, 10 stay, 11 position detector, 12 tag-ID verification database

The invention claimed is:

1. A wireless communication system comprising:
   a first tag installed on a ground outside a track for a running train, the first tag being driven by wirelessly received power;
   a second tag installed outside a side face of the train and above the first tag, the side face extending in a running direction, the second tag being driven by wirelessly received power;
   a wireless communicator which is installed in the train and performs wireless communication with the first tag and the second tag; and
   an antenna which is installed in the train and has a gain in directions of the first tag and the second tag,
   wherein a distance from the antenna to the first tag is longer than a distance from the antenna to the second tag,
   reading characteristics at high speed of the first tag are better than reading characteristics at high speed of the second tag, and
   position detection accuracy at low speed of the second tag is better than position detection accuracy at low speed of the first tag.

2. The wireless communication system of claim 1, wherein the antenna is installed in a range from a location at the first tag side to an end of the side face of the train at the second tag side, rather than a center in a transverse direction of a bottom of the train.

3. The wireless communication system of claim 1, wherein the antenna comprises a plane antenna having a higher gain to the first tag than to the second tag.

4. The wireless communication system of claim 3, wherein the plane antenna has a higher gain in the directions of the first tag and the second tag than in a normal direction of a main surface radiating electromagnetic waves of the plane antenna.

5. The wireless communication system of claim 1, wherein the antenna comprises:
   a first antenna unit having directivity in the direction of the first tag; and
   a second antenna unit which is installed apart from the first antenna unit and has directivity in the direction of the second tag,
   wherein the wireless communicator is connected to the first antenna unit and the second antenna unit.

6. The wireless communication system of claim 1, wherein the wireless communicator comprises a reader to read information stored in the first antenna unit and the second antenna unit.

7. A wireless communication apparatus comprising:
   a wireless communicator to perform wireless communication with a first tag installed on a ground outside a track for a running train and to perform wireless communication with a second tag installed outside a side face of the train and above the first tag, the side face extending in a running direction; and
   at least one antenna having a higher gain to the first tag than to the second tag,
   wherein a distance from the antenna to the first tag is longer than a distance from the antenna to the second tag,
   reading characteristics at high speed of the first tag are better than reading characteristics at high speed of the second tag, and
   position detection accuracy at low speed of the second tag is better than position detection accuracy at low speed of the first tag.

8. The wireless communication apparatus of claim 7, wherein the antenna is installed in a range from a location at the first tag side to an end of the side face of the train at the second tag side, rather than a center in a transverse direction of a bottom of the train.

9. The wireless communication apparatus of claim 7, wherein the antenna comprises a plane antenna having a higher gain to the first tag than to the second tag.

10. The wireless communication apparatus of claim 9, wherein the plane antenna has a higher gain in directions of the first tag and the second tag than in a normal direction of a main surface radiating electromagnetic waves of the plane antenna.

11. The wireless communication apparatus of claim 7, wherein the antenna comprises:
    a first antenna unit having directivity in a direction of the first tag; and
    a second antenna unit which is installed apart from the first antenna unit and has directivity in a direction of the second tag,
    wherein the wireless communicator is connected to the first antenna unit and the second antenna unit.

12. The wireless communication apparatus of claim 7, wherein the wireless communicator comprises a reader to read information stored in the first antenna unit and the second antenna unit.

* * * * *